United States Patent Office 3,252,904
Patented May 24, 1966

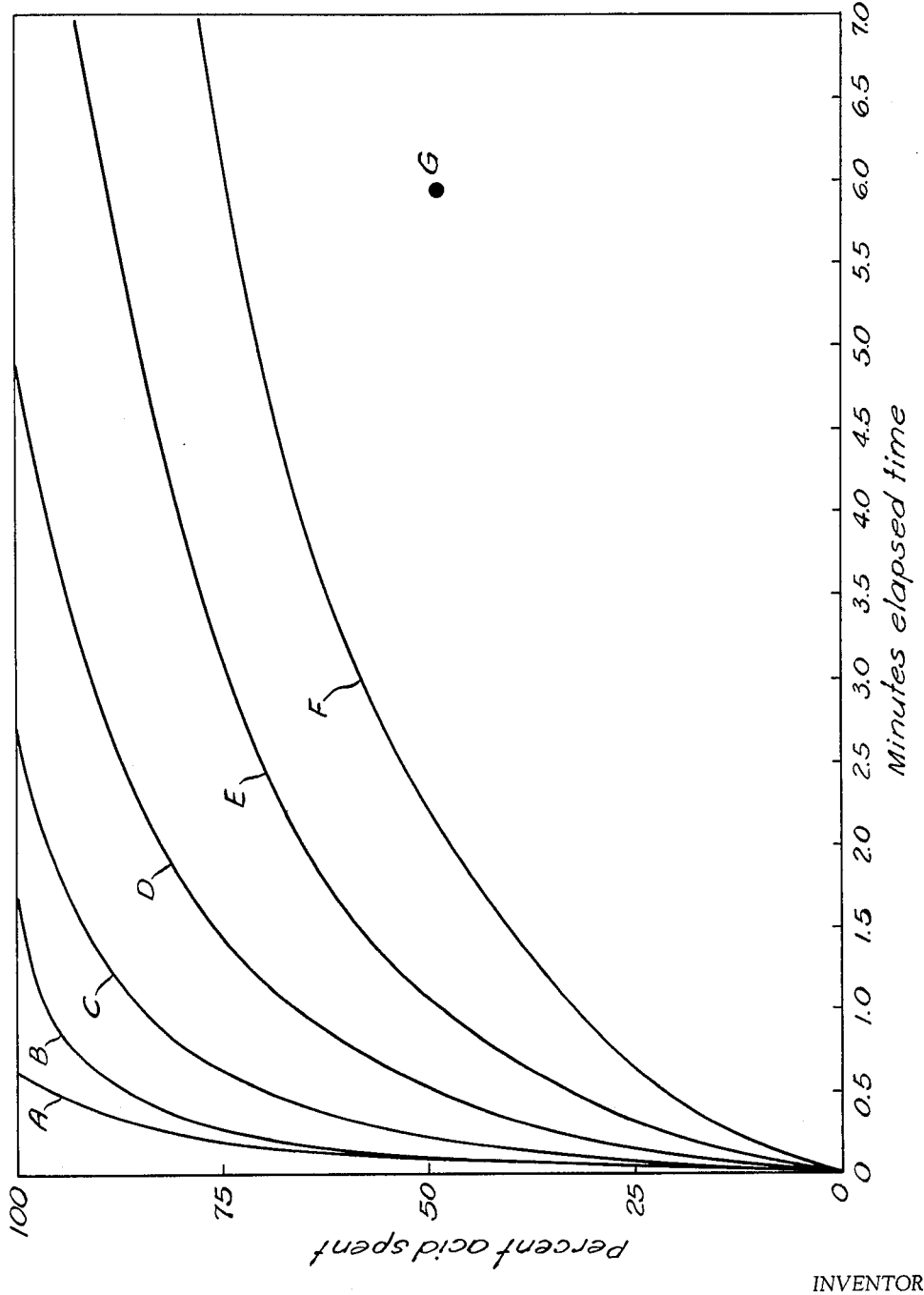

3,252,904
ACIDIZING AND HYDRAULIC FRACTURING
OF WELLS
Norman F. Carpenter, Tulsa, Okla., assignor to The Dow
Chemical Company, Midland, Mich., a corporation of
Delaware
Filed July 9, 1962, Ser. No. 208,252
8 Claims. (Cl. 252—8.55)

This invention relates to acidizing and hydraulic fracturing of earth wells, particularly those adapted to the production of petroleum products. It more particularly concerns an improved composition for acidizing and hydraulic fracturing calcareous oil formations and for hydraulic fracturing other oil formations. The composition comprises a polymeric additament which enhances the action of acid by both retarding the activity and controlling the rate of penetration into the earth formations. It enhances the effectiveness of fracturing fluids by controlling their rate of penetration.

In the art of stimulating production of oil and gas from wells, it has long been known to inject acid solutions, particularly aqueous hydrochloric acid solutions, into the earth formations via the well bores to dissolve soluble portions and thereby increase the effective drainage area of the well bore. Early in the growth and improvement of this process, it was learned that with application of sufficient force to the injected acid, it was possible to cause cracks or fractures within the formation. The fractures act as drainage paths from the formation to the well bore, and to improve upon such drainage, processes and compositions were developed using gelled acids emulsified in oil in an attempt to carry the acid deeply into the fractures before it became spent. If the spending of the acid can be distributed over a wide area, then the benefits of its reaction are greater than if the acid simply spends in the immediate well bore area.

In practice, the resulting degree of penetration of the acid before it spends is not as great as is desired because of the turbulence of the acid as it flows through the narrow fractures and channels of the formation. The turbulence causes the gelled and emulsified acids to be continuously stirred and sheared and all portions of the liquid come into contact with the formation. If the spending of the acid were simply a question of diffusion, the reaction rate would be slowed by the use of gels and emulsions. But, the liquids are pumped at high rates which results in vigorous mixing and intimate contact with the formation so the acid spends almost immediately upon entering a fracture.

In hydraulic fracturing, loss of the fracturing fluid, which is usually oil, water, brine or acid, by penetration into the matrix of the formation decreases the efficiency of the fluid as a fracturing medium. Fracturing is accomplished by increasing the pressure on the fluid first within the well bore to split the surrounding earth formations and, as the fluid flows into the resulting fractures, continuing to pressure the fluid within the fractures to extend the fractures, all the while furnishing the fluid in sufficient supply to fill the growing fractures. It is in the maintenance of a sufficient supply of fluid that penetration into the matrix is a problem, since that fluid which penetrates is of no benefit to extending the fracturing. Fluid must be first supplied to equal the loss to the matrix; only fluid in excess of this amount causes fractures. Compositions to inhibit the loss of the fluid to the formations have been developed, such as mixtures of viscous materials, gels, fine solids and the like to form a filter cake over the surface of the formation. These developments have been fraught with disadvantages, including inefficient prevention of loss of fluid and problems in reestablishing flow through the filter cake when it is desired to produce oil from the well. Thus, there is a need for an improved means of reducing the loss of well fracturing fluids from earth fractures to the surrounding matrix.

It is an object of this invention to provide an improved acid composition and method of acidizing wells whereby acid can be carried deeply into fractures and channels of a formation extending from a well bore before spending is complete.

A further object of this invention is to provide an improved acid composition for treatment of earth formations which has a retarded rate of spending on the formations.

Another object is to provide an improved liquid composition for treating earth formations which has a low rate of penetration or filtration into the matrix of the earth formation from fractures and channels therein.

Still another object is to provide an improved liquid composition for hydraulic fracture treatment of earth formations having a low liquid loss to the matrix of the formations.

An additional object is to provide an oil-base acidizing and fracturing medium which may be carried deeply within formation fractures before spending of the acid is complete.

Other objects and advantages will become apparent as the description of the invention proceeds.

The invention is predicated upon the discovery that water-insoluble, limited crosslinked, polymeric materials in particulate form swell in and thereby become impregnated with aqueous solutions, including acids suitable for acidizing earth formations, water and brine solutions. More particularly, it is predicated upon the discovery that discrete semi-solid elements containing water, brine, hydrochloric acid and the like as an absorbed constituent may be made by soaking particles of crosslinked aqueous insoluble polymeric materials in the aqueous solution. Further, when the absorbed constituent is an acid and the so-swollen particles are dispersed in a liquid and pumped down a well bore and into passageways within the earth formations, the acid is essentially unspent within the swollen particles until finally coming into intimate contact with the surface of the passageways and remaining in such contact for an extended period. As this occurs, the acid diffuses from the particles and thereafter reacts with the formation.

Suitable acids for the practice of this invention are the same as those used in conventional acidizing practice and include the mineral acids such as hydrochloric acid, hydrochloric acid intensified by admixture with hydrofluoric acid or hydrofluoric acid salt mixtures, hydrofluoric acid, nitric acid, organic acids, e.g. acetic, formic, citric and others, which react with the earth formations to produce water-soluble salts. Hydrochloric acid solutions are preferred, being generally available in oil producing areas; a satisfactory concentration for use in this invention is about 2–25% by weight with about 15% being preferred. Satisfactory concentrations for other acids include about 1–15% for hydrofluoric, 2–30% for nitric, 2–20% for acetic and formic and about 1% for citric.

The liquid suitable for carrying the particles swelled with acid into the formation may be non-aqueous or an aqueous solution of the acid being used for swelling the particles, or of another acid satisfactory for treating formations. The non-aqueous fluids may be crude oil, refined or semi-refined oils, such as kerosene, diesel oil, and the like.

Water and brine solutions, as well as acid solutions, are liquids suitable for fracturing earth formations utilizing the particulate limited crosslinked polymers to reduce the liquid loss to the formation in accordance with this invention. Also, the liquid loss of petroleum oils, such as crude oil, refined and semi-refined oils used in fracturing may be similarly reduced. To control the liquid loss of water and brines, the particulate polymers are swollen by soaking in the liquid at hand to form a mixture of the fracturing liquid and the polymer swollen by absorption of at least a portion of that liquid. To control the liquid loss of an oil, the particulate polymers are swollen by an aqueous base material such as water, brine, or acid, and the swollen particles are dispersed into the fracturing oil.

Examples of polymeric materials suitable for the practice of the invention are those which are insoluble in, but swell in at least one of the group of aqueous liquids, including water, brine solutions and acid solutions, and include limited crosslinked polyurethanes, polystyrene sulfonates, polyacrylamides, polyvinyltoluene sulfonates, polyvinylpyrrolidones, polyvinylmorpholinon, and polyammoniumacrylate. Other polymers which in particulate form are swollen by aqueous liquids are also satisfactory for well treatment in the purview of this invention, such as those of U.S. Patent 2,810,716.

A polyurethane polymer satisfactory for use according to this invention is made as follows: 100 parts by weight of a suitable polyglycol such as polyoxyethylene or polyoxypropylene glycol of a molecular weight on the order of 20,000 and containing about 500 p.p.m. of sodium as sodium acetate are mixed with about 1200 parts by weight of benzene in a dry reaction vessel equipped with stirring and heating facilities. The mixture is heated to remove water. Following this, about 1.3 parts by weight of tolylene diisocyanate are added to the reaction mixture and the temperature brought to about 80° C. and held for 1.5 hours; another 1.3 parts tolylene diisocyanate are added to the reaction mixture which is maintained at about 80° C. for a second period of about 1.5 hours. At this point, acetic anhydride is added in a mole-to-mole ratio to the tolylene diisocyanate and the temperature is continued at 80° C. for one-half hour. The limited crosslinked polyurethane polymer which is thus produced is separated from the benzene, dried and ground to a particle size such that it substantially passes a 20-mesh sieve, but is maintained upon a 200-mesh sieve (U.S. Standard Sieve Series). Particles of this size range are of a preferable size for this invention, although particles of a narrower range of size are satisfactory. Particles which pass about a No. 4 to No. 6-mesh sieve and range downwardly to as fine as those retained upon a 325-mesh sieve or less are operable in the invention, but other sizes of the swellable particles may be used. The degree of retardation of the action of acid employing the smaller particles is lessened because of the relatively fast diffusion of acid from the small particles and consequently these particles are not preferred. The upper limit of a size of particle is governed primarily by the size of the fracture openings within the formation during injection of the acid-swollen polymer particles. The particles should be of such size that when swollen they enter the formation without significant tearing, so as to obviate the likelihood of plugging of the passageways at their mouths.

In the above-described example, an aliphatic or aromatic diisocyanate may be employed including hexamethylene diisocyanate; naphthalene diisocyanate and 1, 5-metaphenylene diisocyanate. The polyglycol may have a molecular weight of from 2,000 to about 50,000. An operable molar ratio of the diisocyanate to the polyglycol is between about 2 and 3, while the preferred molar ratio of the diisocyanate to the polyglycol is between about 2.1 and 2.8. A molar ratio of less than about 2 results in a polymer which is acid soluble, while a ratio greater than about 3 results in a polymer which is too dimensionally stable to swell satisfactory when in contact with aqueous acid solutions.

Satisfactory limited crosslinked polyurethane polymers can be polymerized using solvent extraction, melt, or suspension polymerization techniques. These methods of polymerization ordinarily result in polymers which are of a uniform degree of polymerization throughout the mass of material. One form of polymer satisfactory for use in accordance with this invention is that wherein the finished particles have a coherent rind of limited crosslinked copolymer and a center of semi-liquid slightly crosslinked copolymer. These particles may be made by suspension polymerization as exemplified by the following procedure: 3.3 parts by weight of dimethyldioctadecyl ammonium bentonite are dispersed in 300 parts per weight of kerosene and heated to about 100° C. To this is added 150 parts by weight of polyoxyethylene glycol, molecular weight in the range of 9,000, while maintaining the temperature at about 95 to 100° C. About 45 parts by weight of a light hydrocarbon, such as heptane, are added and moisture present in the components is removed by heating under partial vacuum. The mixture is brought to about 65° C. and 4.5 parts of tolylene diisocyanate is added, followed by the addition of 0.07 parts by weight of triethylenediamine contained in 7 parts by weight of benzene. The resulting reaction is allowed to continue for one-half hour at 65° C. when 2.5 parts by weight of acetic anhydride are added. The reactants are held for one-half hour at 65° C., then allowed to cool. Spherical particles of polymer up to about 0.2" in diameter are formed. When soaked in hydrochloric acid solution, the particles swell to about forty times their original volume.

A further example of the polymers satisfactory for use according to this invention is the product of copolymerization of acrylamide with N,N'-methylene-bis-acrylamide. The resulting limited crosslinked polymer is sufficiently crosslinked to be insoluble in acid, but retains the ability to swell in acid solutions. The polymerization process is commonly carried out by heating in an aqueous system acrylamide containing about 4600 parts per million by weight of N,N'-methylene-bis-acrylamide. Polymerization is effected using any of the usual water-soluble oxygen-containing catalysts, such as the ammonium, potassium and sodium persulfates, hydrogen peroxide or an organic hydroperoxide, or the alkali metal and ammonium chlorates and the like. It is generally desirable to use a redox catalyst system of an oxygen-containing compound with a reducing agent such as sodium thiosulfate, sodium or potassium bisulfite or metabisulfite, according to known methods. The polymer product is dried as on a drum dryer and is ground to a particle size of preferably about 95% through a 20-mesh sieve and 100% retained on a 200-mesh sieve. Although N,N'-methylene-bis-acrylamide is a preferred and commercially available compound for use with acrylamide to produce a limited crosslinked copolymer, other alkylidene bisacrylamides are suitable; the suitable compounds may be generally characterized by the formula:

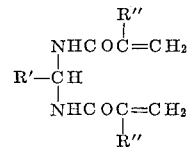

wherein R' is a hydrocarbon residue of an aldehyde and R" is of the group consisting of hydrogen and the methyl radical.

Acrylamide is a preferred comonomer, although any ethylenic compound with a solubility of at least about 2% by weight and preferably at least about 5% in water and which copolymerizes with the alkylidene bisacrylamides in aqueous systems is satisfactory in producing a polymer operable in accordance with the invention.

Limited crosslinked polymers of sodium polystyrene sulfonate using N,N'-methylene-bis-acrylamide as the crosslinking agent constitute another polymer suitable for use in the operation of this invention. The following example is illustrative of a typical procedure for the preparation of limited crosslinked sodium polystyrene sulfonate:

About 200 parts by weight of an approximately 19.6% by weight aqueous solution of sodium styrene sulfonate and about 0.68 part by weight of N,N'-methylene-bis-acrylamide are placed in a closable vessel. The solution is sparged with nitrogen gas for several minutes, after which about 0.07 part by weight of sodium persulfate, as an oxygen-containing catalyst, is added. The mixture is again sparged briefly with nitrogen, following which the vessel is closed and polymerization is effected by heating at about 85° C. for 16 hours. The resulting polymer is dried and ground to about 20–100 mesh. Drying may be accomplished by air drying at about 30° C. for three days followed by up to four hours at 100° C., or until satisfactory grinding may be carried out.

The present invention is not to be construed as limited to the use of sodium polystyrene sulfonate as the unsaturated sulfonic acid factor in the polystyrene type of comonomer. Any organic sulfonic acid which contains a $CH_2=C$ group may also be used. Likewise, suitable substances include those which are so related to such organic sulfonic acids as to be hydrolyzable thereto, i.e., the salts, esters, anhydrides and amides of the sulfonic acids in accordance with the known art for producing crosslinked aqueous swellable polymers of this type.

Satisfactory crosslinking agents include other alkylidene bisacrylamides, as with the acrylamide copolymers discussed earlier.

Limited crosslinked sulfonated polyvinyl toluene is a polymer which has been found satisfactory for employment within the purview of this invention. Such a polymer may be prepared by modifying known methods for polymerizing vinyl toluenes by adding about 0.01 percent, more or less, of divinylbenzene to effect crosslinking in a preparation which otherwise would yield a water-soluble straight chain polymer, and sulfonating and purifying the product as by the teaching of U.S. Patent 3,033,834.

A number of satisfactory limited crosslinked polymers satisfactory for use in accordance with the invention may be made by crosslinking polymers by irradiation. One such material is limited crosslinked polyvinyl pyrrolidone which may be made by treating a 50 percent aqueous solution of the pyrrolidone monomer with gamma radiation, such as from a cobalt 60 source, at a rate of about 0.23 megarad per hour to effect a total dose of about 0.8 megarad. Another material is limited crosslinked polyvinyl morpholinone made by gamma irradiation of a 50 percent aqueous solution of the monomer with a dose of about 0.75 megarad at a rate of 0.3 megarad per hour. A third satisfactory material is the limited crosslinked product obtained by the exposure of polyammonium acrylate in a 69 percent aqueous solution of the monomer for a total dosage of 2.4 megarads using beta radiation, using a beam current of 1-milliampere at a potential of 1 m.e.v.

To illustrate the swelling action of certain of the polymers useful in the practice of the invention, particularly with respect to the degree to which these polymers become swollen in aqueous hydrochloric acid in relation to the extent of crosslinking polymerization of the polymer, portions of each of polyurethane, polyacrylamide, and polystyrene sulfonate limited crosslinked polymers were exposed to aqueous hydrochloric acid solutions. Each of these polymers were prepared according to the procedures previously outlined herein. Measured amounts of the particulated polymer were allowed to swell in acid by keeping the particles covered with a solution of 15% by weight hydrochloric acid for about 2 hours at 80° F. As a measure of the swelling ability, a ratio was determined for each of the polymers wherein the ratio represents the swollen volume divided by the dry volume of the polymer.

Table I, following, shows the degree of swelling as measured by the aforementioned ratio for polymers formed by reaction of diisocyanate with varying molecular weights of polyoxyethylene glycol and when reacted in varying molar ratios. The polymers were prepared by employing ratios of (a) less than 2 moles, (b) between 2.1 and 2.8 moles, and (c) more than 3 moles of diisocyanate per mole of the polyglycol compound. The polymers prepared according to molar ratio (a) are referred to hereinafter as "substantially linear," those by method (b) as "limited crosslinked" and those by method (c) as "highly crosslinked."

*Table I*

| Run No. | Character of Polymer | Molecular Weight of Polyoxyethylene Glycol Employed | Behavior in 15% by Weight Aqueous HCl Media and Factor [1] by which Volume of Polymer Swelled |
|---|---|---|---|
| 1 | Linear Polymer | 4,000 | Dissolved. |
| 2 | ----do---- | 9,000 | Do. |
| 3 | ----do---- | 20,000 | Do. |
| 4 | Limited cross-linked [2] polymer. | 4,000 | Swelled by a factor of 26. |
| 5 | ----do [2]---- | 9,000 | Swelled by a factor of 45. |
| 6 | ----do [2]---- | 20,000 | Swelled by a factor of 43. |
| 7 | Highly cross-linked [3] polymer. | 4,000 | No appreciable swelling. |
| 8 | ----do [3]---- | 9,000 | Do. |
| 9 | ----do [3]---- | 20,000 | Do. |

[1] Swelled volume divided by dry volume.
[2] Suitable for use in practice of invention.
[3] For comparison.

Reference to Table I shows that the operable polymers in accordance with this invention are those which are limited crosslinked and the preferable polyurethane type polymers are those made with polyglycols of the higher molecular weights, i.e., about 5000–20,000. The polymers which dissolve in acid and those which show no appreciable swelling are not operable in this invention; neither would be effective in transporting hydrochloric acid deeply within the fractures of a well during acid treatment.

The operability of polyacrylamide limited crosslinked with N,N'-methylene-bis-acrylamide with regard to swelling of the polymers particles in acid is shown in Table II.

*Table II*

| Run No. | Monomer | Parts per Million Methylene-Bis-Acrylamide Crosslinking Agent | Behavior in 15% by Weight Aqueous HCl or Factor [1] by Which Volume of Polymer Swelled |
|---|---|---|---|
| 10 | Acrylamide | 100 | Dissolved |
| 11 | ----do---- | 250 | 44 |
| 12 | ----do---- | 450 | 56 |
| 13 | ----do---- | 1,000 | 48 |
| 14 | ----do---- | 4,600 | 34 |
| 15 | Acrylamide (30% hydrolyzed). | 100 | 43 |

[1] Swelled volume divided by dry volume.

In Table II, Run No. 10, the polymer resulting from the use of only about 100 p.p.m. of crosslinking agents is primarily straight chain. The polymers resulting from the use of between about 175 and about 6000 p.p.m. agent are primarily limited crosslinked polymers and the use of appreciably more than 6000 p.p.m. produces a highly crosslinked polymer which does not swell in aqueous acid solutions. Run No. 15 of Table II was performed using a partially hydrolyzed acrylamide; the resulting polymer was approximately 30% hydrolyzed anionic polymer, while the remaining 70% was non-hydrolyzed, non-ionic polymer. Satisfactory polyacrylamide polymers to employ in the invention are those crosslinked with about 175 to about 6000 p.p.m. of N,N'-methylene-bis-acrylamide; preferred polymers are those made using about 250 to 5000 p.p.m. Polymers using hydrolyzed acrylamide crosslinked with N,N'-methylene-bis-acrylamide are also usable within the scope of this invention.

Operable sodium polystyrene sulfonate polymers to employ are illustrated by Table III in which the factor by which the particulated polymer swelled, through exposure to acid is demonstrated. In the runs of Table III, the crosslinking agent used was N,N'-methylene-bis-acrylamide. As with the crosslinked polyurethane and polyacrylamide polymers gradations from linear polymers to limited crosslinked polymers to highly crosslinked polymers may be noted.

*Table III*

| Run No. | Percent of Crosslinking Agent in Polymer | Approximate Molecular Weight of Crosslinked Polystyrene Sulfonate Polymer | Behavior in 15% by Weight Aqueous HCl or Factor by Which Volume [1] of Polymer Swelled |
|---|---|---|---|
| 16 | 1.6 | 95,000 | Dissolved |
| 17 | 3 | 95,000 | 12 |
| 18 | 2 | 175,000 | Dissolved |
| 19 | 0.1 | 365,000 | Dissolved |
| 20 | 1 | 365,000 | 2 |
| 21 | 2 | 365,000 | 25 |
| 22 | 4 | 365,000 | 18 |
| 23 | 8 | 365,000 | 10 |
| 24 | 2 | 400,000 | 20 |
| 25 | 4 | 400,000 | 7 |
| 26 | 8 | 400,000 | 0 |

[1] Swelled volume divided by dry volume.

For polystyrene sulfonate polymers, the operable polymers for use in this invention are those limited crosslinked products formed by the crosslinking reaction using about 1 to 8 percent agent in a polymer having a molecular weight about 100,000 to 500,000, more or less. Preferable concentrations of the crosslinking agent are about 1.5 to 5 percent of agent in a polymer of about 300,000 to 400,000 molecular weight.

The effect of limited crosslinked, acid-swellable polymers of various particle sizes in delaying the action of acids upon earth formations in comparison to ordinary aqueous acid solutions, is demonstrated by the following: Tests were made wherein measured quantities of polymer particles of certain sizes, swollen with 15% hydrochloric acid, were vigorously stirred into a brine slurry of marble particles of such a size as to pass a 40-mesh sieve but be retained by a 60-mesh sieve (U.S. Sieve Series). The amount of marble was more than sufficient to neutralize the acid contained within the polymer beads. The brine was synthesized to be representative of those normally encountered in oil well formations and contained about 2.5% calcium chloride, 11.4% sodium chloride and 0.8% magnesium chloride (brines of the same composition were used where synthetic brines are listed elsewhere in this specification). The marble represents calcareous formation, such as would be subject to reaction with acid in a similar manner if the acid were used for treating a well drilled into a calcareous formation. The amount of carbon dioxide gas evolved by the reaction of the acid upon the marble was continuously measured as a means of following the rate at which the acid diffused from the polymer.

The data from these tests are plotted in the drawing, which thus is a graphical representation of the reaction rate of the acid as is diffused from the swollen polymers and spent, according to the particle size of the polymers. The reaction rate of ordinary aqueous HCl is shown for comparison. The curves are plots of the percent of acid spent versus the elapsed time in minutes. Curve A represents the reaction rate of ordinary 15% aqueous hydrochloric acid with no polymer under the same test conditions as the swollen polymers. Curve B represents the reaction rate of 40–60 mesh polymer particles when swollen in 15% HCl. Similarly, curve C represents the reaction rate using 20–40 mesh particles; and curve D, the rate for 10–20 mesh particles. The particles used in these four tests were made according to the procedure described herein for producing particles having a limited crosslinked rind, while the interior is slightly crosslinked; when the particle is swollen with acid, the interior is nearly fluid. Curves E and F are rate plots similarly obtained by the use of 10–20 and 6–8 mesh polymer, wherein the polymer was made according to the procedure described earlier herein which produces particles which are limited crosslinked throughout. From the drawing, the discovery that acid entrapped within the swollen particles spends significantly more slowly than ordinary aqueous HCl solutions is evident.

Point G illustrates the action of the 6–8 mesh polymer when stirred into a kerosene slurry of marble particles, rather than a brine slurry. This point is directly comparable to the point on curve A wherein 50% of the aqueous acid solution has spent and demonstrates that when the polymer is dispersed in oil, the time required for spending is manyfold greater.

The swelling activity in water and in brine (as well as hydrochloric acid) of representative preferred polymers of Tables I, II and III and of the other limited crosslinked polymers described earlier are shown in Table IV. The extent of swelling in this table was determined similarly to the earlier described extent in acid, the polymer in particulate form being covered with the liquid under test for two hours at 80° F. The volume after exposure divided by the volume before exposure expresses the swelling factor.

*Table IV*

| Run No. | Type of Polymer | Character of Crosslinking | Factor by Which Polymer Swelled | | |
|---|---|---|---|---|---|
| | | | In Water | In Brine | In HCl |
| 27 | Polyurethane | See Table I, Run 5 | 44 | 32 | 45 |
| 28 | Polyacrylamide | See Table II, Run 14 | 58 | 44 | 34 |
| 29 | Sodium Polystyrene Sulfonate | See Table III, Run 21 | >200 | 36 | 25 |
| 30 | Polyvinyltoluene Sulfonate | Ca 0.01% DVB [1] | 12 | 10 | |
| 31 | Polyvinyl Pyrrolidone | Irradiated | 3.8 | 41 | 39 |
| 32 | Polyvinyl Morpholinone | do | 16 | 20 | 23 |
| 33 | Polyammonium Acrylate | do | >200 | <1 | |

[1] Polymer crosslinked by use of about 0.01% divinylbenzene.

The swelling action of the limited crosslinked polymers in a liquid is evidence of the ability of the polymer to control the fluid loss of that liquid if it be used as a hydraulic fracturing medium in treating wells. The data of Table V characterize the low-fluid-loss qualities imparted to treating fluids by the swollen polymers of this invention. Fluid-loss data in the table were obtained by tests made following a modification of the fluid loss determination procedure set forth in Section V of the "Recommended Practice Standard Procedure for the Evaluation of Hydraulic Fracturing Fluid," API RP 39, July 1960, published by the American Petroleum Institute.

The various polymer particles under test were exposed for swelling in the particular fracturing fluid being tested by mixing with the fluid and allowing to age for about two hours at about 80° F. Four hundred milliliter portions of the resulting mixture were stirred for one minute on the Type II mixer specified in the aforementioned "Recommended Practice" and the fluid-loss tests were determined at 1000 p.s.i. and 80° F. The apparatus was modified in order that a core of Bedford limestone, one inch in diameter and 3 inches long, might be used as the filtering medium in place of the filter paper set forth in the aforesaid Section V. The Bedford limestone core was mounted in an apparatus much like that described in Section VI of the above identified "Recommended Practice" with the rubber-sleeve type core holder being mounted directly below the reservoir of the apparatus of Section V. The Bedford limestone core was replaced for each test. The individual cores had a natural permeability of about 2–4 millidarcys, a porosity of about 14% and a composition of 98–99% calcium carbonate. Prior to the tests, the cores were saturated with the earlier described synthetic brine.

In these tests the Bedford limestone was substituted for the filter paper to give a test more nearly like well conditions. The use of filter paper in fluid-loss tests has the quality of simplicity, but lacks the thickness dimension obtainable with 3″ of limestone; thickness is a desirable quality for the fluid-loss test media inasmuch as under actual conditions the earth formation is infinite. Consequently, the modified procedure gives data which are more realistic and a better measure of the value of the agent under test than possible by the unmodified API procedure.

mer in the treating media is an operable condition. A preferred concentration of polymer is on the order of about 25 to 100 pounds per 1000 gallons of solution.

When acid is used, concentration of acid used for swelling the polymer may range from about two to about 25%, with about 15% being a preferred and desirable concentration. The acid used for transporting the polymer into the well is preferably of the same concentration as that used to swell the polymer, although other concentrations, as in the range of about 2 to 25%, are operable.

When the aqueous swollen polymers are utilized in a well treatment in an oil-base medium such as crude oil, kerosene, or other refined or semi-refined oils, a desirable concentration of the swollen polymer in the oil-base carrying liquid is about one part by volume to two parts of the liquid. The maximum volume of swollen polymer which can be introduced in this fashion is about equal

*Table V*

| Run No. | Limited Crosslinked Polymer | Character of Crosslinking | Pounds Polymer Per 1,000 Gallons Treating Fluid | Fluid Loss in Milliliters per 25 Minutes | | |
|---|---|---|---|---|---|---|
| | | | | Water | Brine | 15% Hydrochloric Acid |
| 34 | Sodium Polystyrene Sulfonate | See Table III, Run 21 | 16.7 | 11.9 | | |
| 35 | ----do---- | ----do---- | 50 | | 4.8 | |
| 36 | ----do---- | ----do---- | 200 | | | 19.8 |
| 37 | Polyvinyl Toluene Sulfonate | See Table IV, Run 30 | 25 | 25.6 | 2.7 | |
| 38 | ----do---- | ----do---- | 50 | 5.9 | 0.9 | |
| 39 | Polyvinyl pyrrolidone | By Irradiation | 50 | | | 4.2 |
| 40 | Polyvinyl Morpholinone | ----do---- | 50 | | | 2.9 |
| 41 | Polyammonium Acrylate | ----do---- | 25 | 6.0 | | |
| 42 | ----do---- | ----do---- | 50 | 4.5 | | |
| 43 | Polyacrylamide | See Table II, Run 14 | 25 | 4.0 | 15.6 | |
| 44 | ----do---- | ----do---- | 50 | 3.9 | 6.5 | |
| 45 | ----do---- | ----do---- | 100 | | | 9.5 |
| 46 | Polyurethane | See Table II, Run 5 | 10 | 6.0 | | |
| 47 | ----do---- | ----do---- | 25 | 6.5 | 12.6 | |
| 48 | ----do---- | ----do---- | 50 | 2.6 | 8.6 | |
| 49 | ----do---- | ----do---- | 75 | | | 6.6 |
| 50 | ----do---- | ----do---- | 100 | | | 4.5 |
| 51 | Polyurethane, 20–40 Mesh | ----do---- | 100 | | | 3.3 |
| 52 | Polyurethane, 40–100 Mesh | ----do---- | 100 | | | 3.4 |
| 53 | Polyurethane, <100 Mesh | ----do---- | 100 | | | 5.0 |
| 54 | Polyurethane | ----do---- | [1] Acid-Oil | | | 4.1 |
| 55 | ----do---- | ----do---- | [2] Water-Oil | | | 2.0 |
| 56 | None, Control Tests | | | 1.8 | | |
| 57 | None, Control Test, Kerosene containing 0.5% Petrowet R. | | | 270 Kerosene: 96 ml./25 Minutes | 250 | [3] Channeled |

[1] 1 Volume 15% hydrochloric acid swollen polymer dispersed in 3 volumes kerosene using 0.5% Petrowet R.
[2] 1 Volume water swollen polymer dispersed in 3 volumes kerosene using 0.5% Petrowet R.
[3] ⅛″ dia. hole channeled through 3″ core in 15 seconds.

In Table V, control tests were made with no polymer in the water, brine or acid, Run 56, or in the kerosene in Run 57 to provide base for comparison with the swollen polymers. When straight 15% acid was used, it attacked the limestone core rapidly and dissolved a hole through the core within 15 seconds. The acid contained in the reservoir of the apparatus then spurted through the hole and the test was discontinued. Also, the other liquids—water, brine and kerosene—flowed through the core many-fold faster than when a limited crosslinked polymer was present in accordance with the invention.

The fluid loss tests with the cores demonstrate not only my discovery of the fluid loss control factor of the polymer, but also demonstrate the manner by which the polymers function to retard the dissolution of earth formations by the acid. Observations of the ends of the cores exposed to the acid-polymer in aqueous acid and in kerosene mixture showed that the cores were roughened and that shallow incipient holes had been eaten into the limestone. The observations indicate that the acid within the particles of polymer diffused therefrom onto the face of the core and resulted in only gradual dissolution of the limestone. In contrast, during the control test using straight hydrochloric acid, the acid rapidly dissolved a hole through the entire length of the core.

The operable range of concentration for the polymer in aqueous liquids for use in this invention is about 10 to 200 pounds or more per 1000 gallons or about 0.1 to 2.5%, more or less by weight, of aqueous treating solution; about 10% to 80% by volume of swollen polymer parts of polymer and carrying liquid, while a minimum practical concentration is in the order of one part of swollen polymer to ten parts of carrying liquid, although less may be used.

Other carrying vehicles, such as emulsions and gels, may be used in conjunction with the polymers in accordance with known methods of treating wells. It is well-known to fracture oil wells according to the U.S. Patent Reissue No. 23,733 of Farris and improvements thereon have taught the use of oil-acid emulsions, water-oil emulsions, oil-base and water-base gels. It is common to use various additaments in conjunction with the treating fluids or liquids including inhibitors to prevent corrosion of the well equipment by acid, emulsion preventing compounds, surface-active agents or wetting agents, and others. Such additaments may be used in conjunction with the polymers of this invention as with other well stimulating liquids.

In the art of fracturing wells, it is common to use propping agents such as sand, particulated walnut shells, metal pellets and other suitable objects to help keep open fractures which are hydraulically created within the formation by injection of the treating liquid. The treating liquids of this invention using the acid swollen polymers are compatible with these agents and when used in conjunction with them, help in transporting them deeply within the fractures by substantially preventing loss of the treating fluid to the matrix of the formation.

When dispersing particles of polymer swollen in water, brine or acid solutions, such as 15% hydrochloric acid, into an oil-base medium, it is often preferable to use a dispersing agent in order to overcome a tendency of the particles to agglomerate, particularly if they have an opportunity to settle within the oil medium. In most oils, the specific gravity of the swollen particles will be greater than that of the oil and, unless agitation is continuous after the particles have been introduced into the oil, settling will occur. The use of a dispersing agent overcomes the tendency toward agglomeration of the particles upon settling or during idle periods of pumping and mixing during treatment of a well. Satisfactory dispersing agents for this purpose are numerous anionic, cationic, and non-ionic surface active agents. An example of a satisfactory cationic agent is a di-fatty-alkyl quaternary ammonium chloride sold by Armour and Company under the trademark "Arquad 2C." A satisfactory anionic agent is a saturated ten-carbon atom chain hydrocarbon sodium sulfonate sold under the trademark "Petrowet R" by the Du Pont Chemical Company and a satisfactory non-ionic dispersing agent is a diethanolamide of coconut oil marketed under the trade name, "Alrosol," by Geigy Industrial Chemical Company. When certain crude oils are used as the oil-base carrying medium for the polymers, no dispersing agent is needed because of the presence of naturally occurring dispersing agents within the oil. One such crude oil is that produced from the Skinner formation in Oklahoma and another is that produced from wells in Kern County, California.

In the acid treatment of oil wells, hydrochloric acid is commonly used because of its general availability and economic advantage. Hydrochloric acid is a preferred acid for use in the polymer base in accordance with this invention, but the invention is not to be construed as being restricted to this acid. The polymer particles are similarly swollen by aqueous solutions of nitric, citric, hydrofluoric, sulfamic, acetic and other acids and mixtures thereof with one another and with the salts thereof. Acids that are satisfactory for use with polymer particles in the purview of this invention for treating formations in oil wells are those which form acid-soluble salts with the earth minerals and rocks. The polymers are stable to deterioration by acids.

In the art of fracturing wells, the fractures created by hydraulic treatments according to the U.S. Patent Reissue No. 23,733 are commonly on the order of one-tenth to one-fourth inch in width more or less. Propping agents of about one-tenth inch diameter can usually readily be injected into openings in the formation, whereas those which are larger often tend to filter out and stay within the bore hole. It has been found the polymer particles swollen with liquid according to this invention will readily enter fractures of width less than the radius of the particle when introduced into such fractures with hydraulic pressures of one to two pounds per square inch. Under well conditions where the magnitude of differential pressure between the well bore and a fracture is considerably greater, particles which before swelling are as large as just passing a 10-mesh sieve and larger readily enter the fractures along with the sand or other propping agents which may be used and thereby assist in the placement of the propping agent.

The polymers used in this invention absorb acids such as hydrochloric acid to become swollen with acid of the same strength as that of the swelling media. This is manifest from a test wherein polyurethane crosslinked polymer particles were exposed to hydrochloric acid of 15.1% by weight strength. A determination of the strength of the acid within the swollen particles showed that it was 15.1% by weight.

The following treatment for stimulating the production of oil from a producing well located in Barton County, Kansas is illustrative of the practice of the invention. The well had been drilled through the Kansas City limestone formation and casing had been set therein and perforated at the 3134' to 3136' depth level. When new, the well produced as high as 60 barrels of oil per hour, but production declined with use to about 0.8 barrel of oil per hour. Prior to treatment according to the invention, the well was given an ordinary acid treatment by injecting 1500 gallons of 15% hydrochloric acid containing a conventional inhibitor to prevent corrosion of the metal equipment. In accordance with conventional reservoir engineering methods, the Productivity Index of the well was calculated from the hourly pumping production rate, static pressure and pumping production pressure and found to be 1.16. Similarly, the capacity of the well was calculated to be 314 barrels of oil per day.

Twenty days following the ordinary acidizing treatment, the well was re-treated in accordance with the invention using 1500 gallons of 15% hydrochloric acid containing 150 pounds of 20–200 mesh particulated polyurethane limited crosslinked polymer. In preparation for the treatment, 1500 gallons of 15% hydrochloric acid containing 3 gallons of a solution of corrosion inhibitor composed of 16½ pounds of sodium hydroxide and 64½ pounds of arsenic trioxide dissolved in enough water to make 3 gallons were placed in a tank equipped with mixing facilities. To this solution was added the 150 pounds of polymer. The mixture was stirred gently for two hours during which time, the polymer particles swelled to about 40 times their original volume. As a result, about one-third the volume of the 1500 gallons of acid was now contained within the swollen particles of polymer, while two-thirds remained free and acted as a slurrying agent for the so-swollen polymer particles.

The acid-swollen particle slurry was pumped into the well and displaced into the formation following conventional well-treating practice. After it had remained within the formation for about one-fourth hour, the well was put on production by pumping. The Productivity Index of the well based upon tests made on the well three days later showed that the Index had risen to 2.81 and that the capacity of the well had risen to 762 barrels of oil per day.

Another treatment illustrative of the invention was the treatment of a gas well drilled in Kingfisher County, Oklahoma. This well had been completed in the Manning formation at 7851' to 7875'. Before being treated in accordance with this invention, the well had a shut-in pressure after a 24-hour flow test of 2395 pounds per square inch, and an open flow potential of 7,201,000 cubic feet of gas per day. The well was treated by pumping into the formation 10,000 gallons of 15% hydrochloric acid containing 500 pounds particulate limited crosslinked polyurethane polymer wherein the particles were about 20% each in the sieve sizes between 20 and 40, 40 and 100, 100 and 200, 200 and 325, and less than 325 mesh. This was followed by 2000 gallons of 15% hydrochloric acid, which was displaced down the well bore tubing and into the Manning formation with 2500 gallons of a brine. The acid solutions were inhibited against corrosion of the well equipment by the use of arsenic trioxide as in the previous treatment example. Tests of the capacity of the well following the treatment showed a shut-in pressure after a 24-hour flow test of 2545 pounds per square inch and an open flow potential of 98,000,000 cubic feet per day. These results were about eightfold better than comparable acid treatments without a limited crosslinked polymer in the area.

From the increase in Productivity Index and the production capacity of the Kansas well, and from the increase in pressure and potential in the Oklahoma well, it is clearly manifest that the treatments using polymer particles swollen with hydrochloric acid benefited the wells through the retarded acidizing action of the acid entrapped within the polymer particles and through the action of the polymer particles in reducing the loss of the free hydrochloric acid solution in the fractures and channels immediately surrounding the well bore, whereby the free hydrochloric acid solution traveled deeply into the formation before spending.

I claim:
1. In a method of acidizing an earth formation penetrated by a borehole, the step which consists of injecting into said borehole, a composition comprising in the majority a non-viscous and non-gelled aqueous solution of from about 2 to 25 percent by weight hydrochloric acid having slurried therein a solid particle phase of from about 0.1 to 2.5 percent by weight of a particulate limited crosslinked polyurethane polymer produced by polymerization of a diisocyanate and a polyglycol of molecular weight from about 4000 to 30,000 in a molar ratio of between about 2 and 3 having initial particle size substantially in the range of from 6 to 200 mesh, said polymer being swollen by imbibition of between about 10 and 60 volumes of an aqueous solution of from about 2 to 25 percent hydrochloric acid.

2. In a method of hydraulic fracturing an earth formation penetrated by a borehole, the step which consists of injecting into said borehole at fracturing pressure, a composition comprising in the majority of non-viscous and non-gelled liquid, selected from the class consisting of water, brines, aqueous solutions of HCl, HF, and acetic acids and mixtures thereof, and crude and refined petroleum oils, having slurried therein a solid particle phase by weight of a particulate limited crosslinked polyurethane polymer produced by polymerization of a diisocyanate and a polyglycol of molecular weight about 4000 to 30,000 in a molar ratio of between about 2 and 3 having initial particle size substantially in the range of 6 to 200 mesh, said polymer being swollen by imbibition of between about 10 and 60 volumes of an aqueous solution of about 2 to 25 percent hydrochloric acid.

3. In a method of acidizing an earth formation penetrated by a borehole, the step which consists of injecting into said borehole a composition comprising in the majority a non-viscous and non-gelled aqueous solution of from about 2 to 25 percent by weight hydrochloric acid having slurried therein a solid particle phase of from about 0.1 to 2.5 percent by weight hydrochloric acid having slurried therein a solid particle phase of from about 0.1 to 2.5 percent by weight of a crosslinked polyacrylamide polymer produced by polymerization of acrylamide with from 175 to 6,000 parts per million of N,N'-methylene-bis-acrylamide having initial particle size substantially in the range of 6 to 200 mesh, said polymer being swollen by imbibition of between about 10 and 60 volumes of an aqueous solution of from about 2 to 25 percent hydrochloric acid.

4. In a method of hydraulic fracturing an earth formation penetrated by a borehole, the step which consists of injecting into said borehole at fracturing pressure a composition comprising in the majority a non-viscous and non-gelled liquid, selected from the class consisting of water, brines, aqueous solutions of HCl, HF, and acetic acids and mixtures thereof, and crude and refined petroleum oils, having slurried therein a solid particle phase of about 0.1 to 2.5 percent by weight of a crosslinked polyacrylamide polymer produced by polymerization of acrylamide with 175 to 6,000 parts per million of N,N'-methylene-bis-acrylamide having initial particle size substantially in the range of from 6 to 200 mesh, said polymer being swollen by imbibition of between about 10 and 60 volumes of an aqueous solution of from about 2 to 25 percent hydrochloric acid.

5. In a method of acidizing an earth formation penetrated by a borehole, the step which consists of injecting into said borehole a composition comprising in the majority a non-viscous and non-gelled aqueous solution of from about 2 to 25 percent by weight hydrochloric acid having slurried therein a solid particle phase of from about 0.1 to 2.5 percent by weight of a crosslinked sodium polystyrene sulfonate polymer produced by copolymerization of sodium styrene sulfonate with from about 1.5 to 5 percent by weight of an alkylidene bis-acrylamide having initial particle size substantially in the range of from 6 to 200 mesh, said polymer being swollen by imbibition of between about 10 and 60 volumes of an aqueous solution of about 2 to 25 percent hydrochloric acid.

6. In a method of hydraulic fracturing an earth formation penetrated by a borehole, the step which consists of injecting into said borehole at fracturing pressure a composition comprising in the majority a non-viscous and non-gelled liquid, selected from the class consisting of water, brines, aqueous solutions of HCl, HF, and acetic acids and mixtures thereof, and crude and refined petroleum oils, having slurried therein a solid particle phase of from about 0.1 to 2.5 percent by weight of a crosslinked sodium polystyrene sulfonate polymer produced by copolymerization of sodium styrene sulfonate with from about 1.5 to 5 percent by weight of an alkylidene bis-acrylamide having initial particle size substantially in the range of from 6 to 200 mesh, said polymer being swollen by imbibition of between about 10 and 60 volumes of an aqueous solution of from about 2 to 25 percent hydrochloric acid.

7. In a method of acidizing an earth formation penetrated by a borehole, the step which consists of injecting into said borehole, a composition comprising in the majority a non-viscous and non-gelled aqueous solution of from about 2 to 25 percent by weight hydrochloric acid, having slurried therein a solid particle phase of from about 0.1 to 2.5 percent by weight of a particulate polymer which has been crosslinked by irradiation, said polymer being selected from the class consisting of polyvinyl pyrrolidone crosslinked by about 0.8 megarad, polyvinyl morpholinone which has been crosslinked by about 0.75 megarad, and polyammonium acrylate which has been crosslinked by about 2.4 megarads of irradiation.

8. In a method of hydraulic fracturing an earth formation penetrated by a bore hole, the step which consists of injecting into said borehole at fracturing pressure, a composition comprising in the majority a non-viscous and non-gelled liquid selected from the class consisting of water, brines, aqueous solutions of HCl, HF, and acetic acids and crude and refined petroleum oils, having slurried therein a solid particle phase of from about 0.1 to 2.5 percent by weight of a particulate polymer which has been crosslinked by irradiation, said polymer being selected from the class consisting of polyvinyl pyrrolidone crosslinked by about 0.8 megarad, polyvinyl morpholinone which has been crosslinked by about 0.75 megarad, and polyammonium acrylate which has been crosslinked by about 2.4 megarads of irradiation.

References Cited by the Examiner

UNITED STATES PATENTS

| | | | |
|---|---|---|---|
| 2,596,843 | 5/1952 | Farris | 252—8.55 |
| 2,647,886 | 8/1953 | Seymour | 252—8.5 |
| 2,763,326 | 9/1956 | Cardwell et al. | 252—8.55 |
| 2,798,053 | 7/1957 | Brown | 252—89 |
| 2,801,218 | 7/1957 | Menaul | 252—8.55 |
| 2,801,984 | 8/1957 | Morgan et al. | 252—8.5 |
| 2,810,716 | 10/1957 | Markus | 260—88.1 |
| 2,824,833 | 2/1958 | Cardwell et al. | 252—8.55 |
| 2,842,338 | 7/1958 | Davis et al. | 252—8.55 |
| 2,867,278 | 1/1959 | Mallory et al. | 260—77.5 |
| 2,891,619 | 6/1959 | Sneary | 252—8.55 |
| 3,025,234 | 3/1962 | Canterino | 252—8.5 |
| 3,085,977 | 4/1963 | Park et al. | 252—8.5 |
| 3,133,039 | 5/1964 | Davis et al. | 260—79.3 |

JULIUS GREENWALD, *Primary Examiner.*

ALBERT T. MEYERS, *Examiner.*

H. B. GUYNN, *Assistant Examiner.*